(12) United States Patent
Ceron Garcia et al.

(10) Patent No.: US 8,938,881 B2
(45) Date of Patent: Jan. 27, 2015

(54) SYSTEM FOR MANUFACTURING FACETS FOR HELIOSTATS

(75) Inventors: Francisco Ceron Garcia, Seville (ES); Valerio Fernandez Quero, Seville (ES); Antonio Esteban Garmendia, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 128 days.

(21) Appl. No.: 13/383,552

(22) PCT Filed: Jul. 13, 2010

(86) PCT No.: PCT/ES2010/000301
§ 371 (c)(1),
(2), (4) Date: Feb. 28, 2012

(87) PCT Pub. No.: WO2011/007024
PCT Pub. Date: Jan. 20, 2011

(65) Prior Publication Data
US 2012/0144651 A1 Jun. 14, 2012

(30) Foreign Application Priority Data

Jul. 14, 2009 (ES) .................. 200901585

(51) Int. Cl.
| B21D 53/06 | (2006.01) |
| G02B 5/10 | (2006.01) |
| F24J 2/10 | (2006.01) |
| F24J 2/07 | (2006.01) |
| F24J 2/46 | (2006.01) |

(52) U.S. Cl.
CPC ................. *G02B 5/10* (2013.01); *F24J 2/1057* (2013.01); *Y02E 10/40* (2013.01); *F24J 2/07* (2013.01); *F24J 2002/1085* (2013.01); *F24J 2002/4676* (2013.01)
USPC ...... 29/890.033; 359/846; 359/847; 359/849; 359/851; 353/3

(58) Field of Classification Search
CPC ..... F24J 2/07; F24J 2/1057; F24J 2002/4676; F24J 2002/1085; Y02E 10/40; G02B 5/10
USPC ............. 29/890.033; 359/846, 847–849, 851; 353/3
See application file for complete search history.

(56) References Cited

U.S. PATENT DOCUMENTS 2,793,887 A * 5/1957 Moore .......................... 403/291
(Continued)

FOREIGN PATENT DOCUMENTS

| CA | 2 237 882 | 1/2000 |
| DE | 31 31 263 | 2/1983 |
| ES | 247059 | 10/1981 |

(Continued)

*Primary Examiner* — David Bryant
*Assistant Examiner* — Ruth G Hidalgo-Hernande
(74) *Attorney, Agent, or Firm* — Hamre, Schumann, Mueller & Larson, P.C.

(57) ABSTRACT

System for manufacturing facets comprising a frame a series of mirrors and multiple securing parts in which said parts are the key to the invention and are formed by a rod and a circular metal sheet provided with a series of small circular perforations, where the rod and the circular sheet are attached by electric arc welding or any other equivalent fixation and the purpose of which is to secure a curved mirror to the rear structure or frame of a heliostat.

1 Claim, 2 Drawing Sheets

(56) References Cited

U.S. PATENT DOCUMENTS

| | | |
|---|---|---|
| 4,511,214 A | 4/1985 | Klein |
| 6,217,178 B1 * | 4/2001 | Drumheller et al. .......... 359/849 |
| 2004/0040641 A1 | 3/2004 | Blackmon |

FOREIGN PATENT DOCUMENTS

| | | |
|---|---|---|
| ES | 281691 | 4/1985 |
| ES | 2265063 | 2/2007 |
| ES | 2299109 | 5/2008 |

* cited by examiner

SYSTEM FOR MANUFACTURING FACETS FOR HELIOSTATS

TECHNICAL FIELD OF THE INVENTION

The present invention describes a fixation system of mirrors to a structure or frame that will be later mounted as a part of a heliostat used in concentration solar thermal plants.

BACKGROUND OF THE INVENTION

The general principle of solar thermal technology is based on the concept of concentration of solar radiation to heat a heat transfer fluid and generate electricity.

Solar energy collection and its concentration is one of the greatest challenges in the development of solar thermal plants. There are mainly two types of technologies of concentrators: spot concentration and linear concentration. Linear concentration is easier to install because it has fewer degrees of freedom, but it has a lower concentration factor and therefore reaches lower temperatures than spot concentration technology.

Within spot concentrators, parabolic disc concentrators and the tower or central receiver power plants can be distinguished. Within the linear technology, there are the Parabolic Cylinder Concentrators (PCC) and the new Fresnel-type Linear Concentrators (FLC).

Both the central receiver power plants and the FLC require a field of heliostats to capture and concentrate solar power.

A heliostat consists of a panel with a surface of 40 to 120 $m^2$ consisting of a set of mirrors that are on a frame. Each mirror unit with its frame unit is called a facet. The set of all these facets is what will be later mounted on the mobile structure of the heliostat (trusses, arms and actuation).

Usually, this structure has solar tracking by two movements, azimuthal and elevation, so that the reflected rays reach at all times a focal point located at the top of a tower in which the receiver is located. A heat transfer fluid circulates through the receiver from which electrical energy is produced.

To concentrate solar radiation these reflecting mirrors are slightly curved, the radius of curvature being one of the critical optical characteristics in the manufacture of the same, to direct sunlight correctly with great precision to the receiver.

According to the distance to which the receiver is placed, mirrors have a certain curvature. To achieve the highest performance possible, the curvature parameters of the mirror surface must be respected as closely as possible.

It is of vital importance to develop resistant, reliable heliostats with high optical quality and at a low cost to achieve a feasible solar thermal plant, since the heliostat field is responsible for approximately half of the total cost of these power plants.

That is why there is a tendency to manufacture heliostats of large surface area and to use mass production, to be able to reduce the manufacturing costs to the maximum.

Thereby, any system or invention that achieves simplifying the assembly and manufacture of these mirrors, as well as increasing strength and reliability, is a very important progress for this type of technology.

One of the manufacturing systems of facets that has been used until now consists of binding with adhesive a mirror to a carrier construction. This involves taking the flat mirror and placing it on a carrier surface that has the desired curvature, spreading adhesive and placing an outer annular frame or some form of fixation thereon to remain until the adhesive hardens. If the curvature to which the mirror has to be subjected is very sharp, thermal forming procedures are used in addition.

This solution is very expensive because the carrier structure must meet the exact requirements of precision outlined above.

An alternative to try to reduce costs that is known is the manufacture of a mirror without such precision and carrying out the precision adjustment subsequently (CA2237882A1). Therefore defining in the carrier structure the different points where the adjustment screws will be introduced is necessary. This procedure needs a high quality of the materials used in the carrier structure as well as employing specialized personnel for the adjustment.

Therefore, the present invention is intended to provide a procedure for the manufacture of facets and more specifically developing a securing system of mirrors to the structure that facilitates the assembly of the same, does not entail loss of precision, and yet improves properties and allows a low-cost mass production.

BRIEF SUMMARY OF THE INVENTION

The invention consists of a system for securing mirrors to a frame that will be later mounted to help form the heliostat. The set of mirrors and frames will form the heliostat facets.

This system, in contrast to the known state of the art, does not use the securing of the mirror by adhesive or screws to a carrier structure that has the preset curve, but rather it consists of securing the mirrors directly to a frame, of using a type of securing parts that is described below and that is the key to achieving the securing of a curved mirror to its structure, and of achieving to maintain a radius of curvature extremely precisely in the mirror.

The parts used to carry out this attachment are composed of a rod with a small quick nut-type securing that has certain flexibility such that the mirror won't break, this rod being welded to a circle of perforated sheet.

This circle is fixed through silicone to the mirror, which silicone will flow over the perforations in the sheet.

Thanks to the circular shape of the sheet, a better distribution of the efforts than using fixations in any other way is achieved.

Silicone is used for its elasticity as it helps to avoid tensions in the mirror that could produce rupture. At the same time it achieves a compensating for the required accuracy tolerances, also thanks to its flexibility.

To this is added the use of an anti-corrosion protection surface treatment for all metal components of the described fixations which prevents the oxidation of the same in the field.

This securing procedure has managed to reduce the cost of the facets by 10 times its value.

DESCRIPTION OF THE DRAWINGS

To complete the description that is being carried out and for a better understanding of the invention, the description is accompanied by a set of drawings where with illustrative and not limiting character, the following has been represented.

DESCRIPTION OF THE INVENTION

To achieve a better understanding of the invention, the procedure for mounting the facets to the structure of the heliostat are described next, according to a preferred embodiment.

Figure 1:
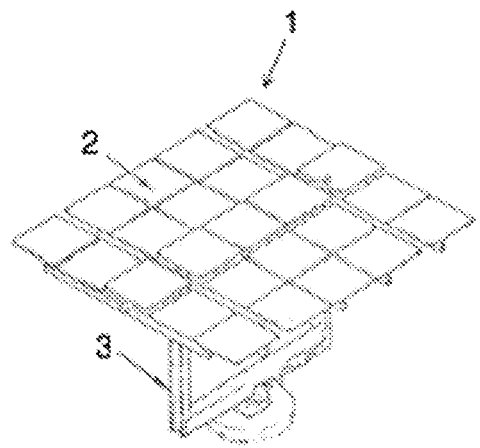
FIG. 1: Scheme of a heliostat

In the first place and as seen in FIG. 1, a representative heliostat (1), has an area of approximately 121 m² and consists of 28 facets (2). The set of facets (2) is placed on a structure (3) (arms plus pedestal) that usually performs two movements to achieve solar tracking and thus being able to carry out the necessary pointing control in each case. The set of facets (2) and structure (3) forms the heliostat (1).

Figure 2:
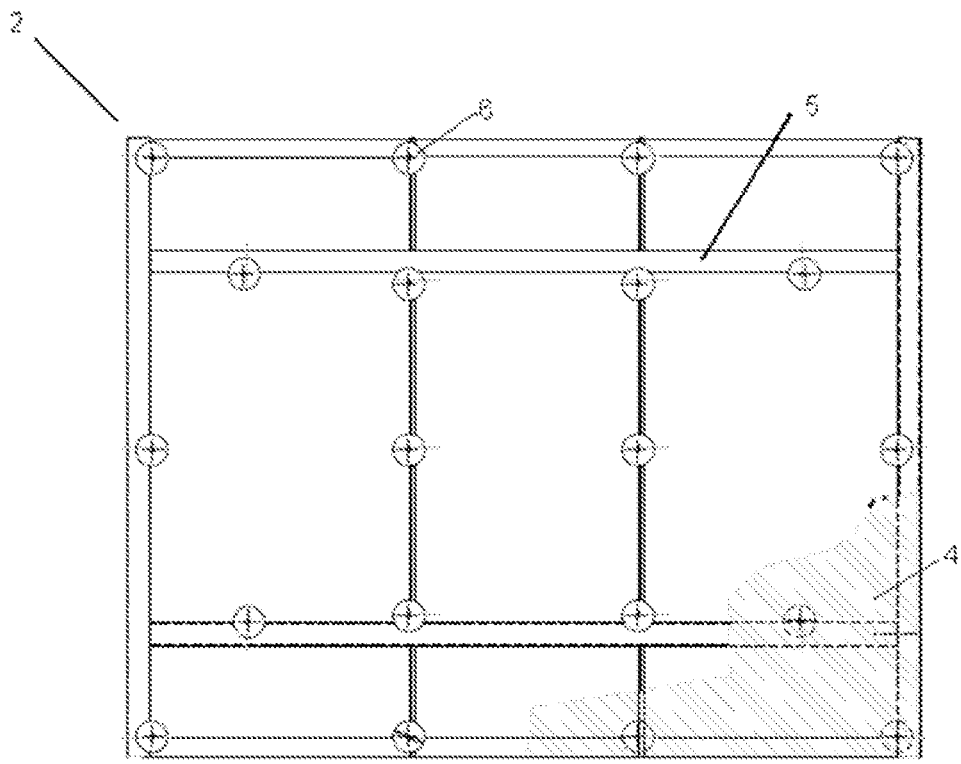
FIG. 2: Scheme of a facet (mirror attached to the frame)

In FIG. 2 the scheme of a facet (2) is depicted. The facet composed of a mirror (4) attached to a frame (5) through a series of securing parts (6) described below and that are the key to the invention.

Thus, the invention consists of placing the mirrors (4) on the frame (5) to produce the facets (2). Once the facets (2) are manufactured, the mounting on the structure (3) of arms plus pedestal is carried out and the heliostat (1) is finished.

Figure 3:
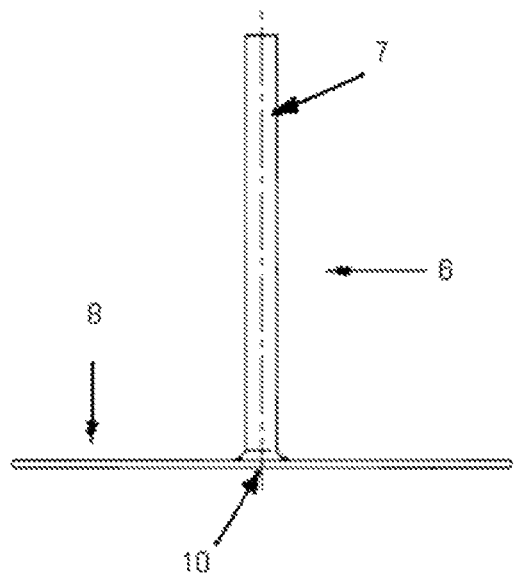
FIG. 3: Securing part. Elevational view.
Figure 4:
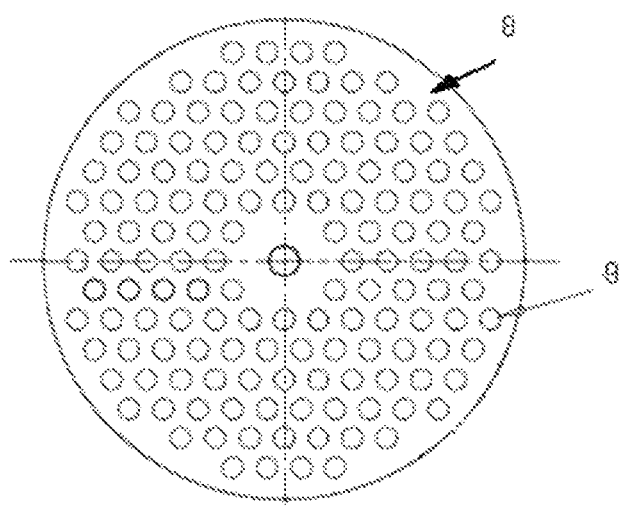
FIG. 4: Securing part. Plan view.

The securing parts (6), which are the main element of the invention, are shown in FIGS. 3 and 4.

These parts (6) comprise a rod (7) and a circular metal sheet (8). That sheet has a series of small circular perforations (9).

The attachment between the rod (7) and the perforated metal sheet (8) is done through electric arc welding (10) or other means that ensures the same firmness.

The following describes the procedure for manufacturing the facets (2), which comprises the following stages:
1. Screwing the securing parts (6) to the frame (5)
2. Impregnating the perforated metal sheet (8) of the securing parts with silicone or equivalent adhesive (6)
3. Provisionally attaching the mirror (4) to the frame (5) through the parts impregnated with silicone, forming the facet (2)
4. Placing the facet (2) face-down on a vacuum forming table
5. Placing a series of separators between the frame (5) and the mirror (4)
6. Loosening the screws of the fixation system (6)
7. Making a vacuum in the forming table thereby achieving acquiring the desired radius of curvature of the mirror (4)
8. Screwing the securing system (6) linking mirror (4) and frame (5)
9. Removing the separators
10. And finally removing the vacuum of the forming table to be able to remove the facet (2).

In this way the mirror (4) is fixed to the frame (5), and the appropriate curvature is achieved. The facet is mounted on the structure (3) to finish the heliostat (1).

In addition to the previously highlighted advantages such as reliability, flexibility and low cost, there are the advantages of speed of the manufacture of the facet, as described in the procedure, and the fact of requiring a single frame for any curve that you want to give to the mirror.

This attachment system is especially designed for application in the manufacture of facets for heliostats for solar concentration plants, but does not preclude its extension to other fields of industry that require assemblies with similar characteristics.

The invention claimed is:

1. A method for manufacturing a system of facets for a heliostat, each facet being attached to a structure, each facet including a mirror and a frame attached together using a plurality of securing parts, each of said securing parts including a rod and a circular metal sheet having a series of small circular perforations, the rod of each of said securing parts being attached to the frame securing device that has flexibility and the purpose of which is to secure the curved mirror to the frame, said method comprising:
   screwing the securing parts to the frame;
   impregnating the perforated metal sheets of the securing parts with silicone or an equivalent adhesive;
   provisionally attaching the mirrors to the frames through the perforated metal sheets impregnated with the silicone or the equivalent adhesive, thereby forming the facets;
   placing the facets face-down on a vacuum forming table;
   placing a series of separators between the frames and the mirrors;
   loosening the securing parts;
   making a vacuum in the forming table thereby achieving the desired radius of curvature of the mirrors;
   tightening the securing parts linking the mirrors and frames;
   removing the separators; and
   removing the vacuum of the forming table so as to be able to remove the facets.

* * * * *